United States Patent [19]

Gelderie et al.

[11] Patent Number: 6,159,606
[45] Date of Patent: Dec. 12, 2000

[54] FIRE-RESISTANT GLAZING PANEL

[75] Inventors: Udo Gelderie, Stolberg; Simon Frommelt, Haan; Michael Groteklaes-Bröring, Aachen; Dirk Michels, Mönchengladbach, all of Germany

[73] Assignee: Vetrotech Saint-Gobain International (AG), Walchwill, Switzerland

[21] Appl. No.: 09/269,074

[22] PCT Filed: Jul. 22, 1998

[86] PCT No.: PCT/EP98/04927

§ 371 Date: Jan. 14, 2000

§ 102(e) Date: Jan. 14, 2000

[87] PCT Pub. No.: WO99/04970

PCT Pub. Date: Feb. 4, 1999

[30] Foreign Application Priority Data

Jul. 22, 1997 [DE] Germany ............................ 197 31 416

[51] Int. Cl.[7] ...................................................... B32B 17/00
[52] U.S. Cl. .......................... 428/426; 428/428; 428/435; 428/440; 428/441; 428/702
[58] Field of Search ..................... 428/426, 428, 428/435, 440, 441, 701, 702

[56] References Cited

U.S. PATENT DOCUMENTS

| 4,264,681 | 4/1981 | Girard et al. ............................ 428/429 |
| 5,322,557 | 6/1994 | Inomata et al. ....................... 106/287.4 |
| 5,565,273 | 10/1996 | Egli et al. ............................... 428/426 |

FOREIGN PATENT DOCUMENTS

| 0 001 531 | 4/1979 | European Pat. Off. . |
| 0 549 335 | 6/1993 | European Pat. Off. . |
| 0 606 174 | 7/1994 | European Pat. Off. . |
| WO 94/04355 | 4/1994 | WIPO . |

*Primary Examiner*—Timothy M. Speer
*Attorney, Agent, or Firm*—Pennie & Edmonds LLP

[57] ABSTRACT

A fire-resistant glazing panel comprises at least two glass sheets, between which is placed a transparent fire-resistant material made of a cured alkali metal polysilicate hydrate. At least one glass sheet is provided, on its surface which is in contact with the fire-resistant material, with a primer layer, the adhesion of which to the fire-resistant layer decreases at the temperatures of the test of behaviour towards fire. At the temperature of the test of behaviour towards fire, the glass sheet exposed to the fire separates completely from the fire-resistant material. For this reason, the polysilicate fire-resistant shield remains intact, even when the glass sheet exposed to the fire shatters and when the fragments fall off.

12 Claims, No Drawings

FIRE-RESISTANT GLAZING PANEL

TECHNICAL FIELD

The present invention relates to a glazing panel for protecting against fire (fire-resistant) comprising at least two glass sheets, between which is placed a transparent layer made of a cured alkali metal polysilicate hydrate having an $SiO_2:M_2O$ ratio of at least 3:1 (where M denotes at least one alkali metal) and a water content of 25 to 60% by weight, in which glazing panel at least one glass sheet is provided, on its surface which is in contact with the polysilicate layer, with a primer layer which has an influence on the adhesion.

BACKGROUND ART

Fire-resistant glazing panels of this kind are known from the document WO 94/04355. In this case, the transparent layer preferably comprises alkali metal polysilicate hydrate having an $SiO_2:M_2O$ ratio of greater than 4:1 (where M denotes at least one alkali metal) and each glass sheet is provided with a primer layer formed of an organofunctional silane. The polysilicate layer foams in the event of fire under the effect of the heat with the evaporation of the water, it becomes impermeable to heat radiation and forms, for a predetermined period, an effective protection against undesirable transition of heat. In these known fire-resistant glazing panels, the organofunctional silanes have to influence the adhesion in the sense of improving the adhesion of the polysilicate layer to the glass sheets under all conditions and they are chosen from this viewpoint.

In WO 94/04355, good adhesion between the polysilicate layer and the glass surfaces is stated to be necessary and has to be guaranteed throughout the lifetime of the fire-resistant glazing panel, because delaminations of the polysilicate layer are visible in the form of quality defects with a large surface area.

Fire-resistant glazing panels in which the fire-resistant layer placed between two glass sheets is formed of a saline hydrogel comprising an organic agent forming a gel, for example based on acrylamide and/or methylolacrylamide, are known from the documents EP 0 001 531 B1 and EP 0 590 978 A1. In such fire-resistant glazing panels, the faces of the glass sheets which are in contact with the hydrogel are again treated with a substance which improves the adhesion.

In this case, use is exclusively made, as substances which improve the adhesion, of hydrophilic organic substances based on silanes, on titanates or on zirconates which react, on the one hand, with the surface of the glass and, on the other hand, with the carbon-carbon double or triple bonds of the polymer forming the gel.

During tests of behaviour towards fire carried out with fire-resistant glazing panels with the structure cited above, that is to say comprising an intermediate layer formed of an alkali metal polysilicate, it turns out that, after a specific time, locally restricted points frequently develop in which the protective effect of the foaming polysilicate layer decreases, so that the glass sheet of the fire-resistant glazing panel facing away from the fire exceeds the allowed temperature at these points. The formation of these defects, which are excessively overheated (hot spots), causes parts of the polysilicate foam to escape from the layer and fall off in the flame furnace.

SUMMARY OF THE INVENTION

The aim of the invention is the development of an improved fire-resistant glazing panel with the structure cited in the preamble, in order to decrease the appearance of these defects which are locally formed and thus to extend the duration of resistance to fire of the fire-resistant glazing panel.

This aim is achieved according to the invention owing to the fact that at least one glass sheet, namely that which will be exposed to the fire, is provided, on its surface which is in contact with the polysilicate layer, with a primer layer, the adhesion of which decreases at the temperatures of the test of behaviour towards fire (or test of fire-resistance).

This is because the invention is based on the discovery that, with the glazing panels of the prior art, the defects appear, during tests of behaviour towards fire, owing to the fact that the glass sheet which is exposed to the fire shatters, when a predetermined temperature gradient between the surface of the glass sheet and the embedded edge of the glass sheet is exceeded, due to tensile stresses which are formed in the region of the edge, and that the glass fragments which fall off from the sheet carry with them pieces of the polysilicate fire-resistant layer, because the adhesion of the polysilicate material to the glass is greater than the cohesive forces within the polysilicate material.

For this reason, the invention provides for the decrease in the adhesion of the polysilicate material to the glass at the temperatures of the test of behaviour towards fire, so that the cohesive forces in the polysilicate material prevail and that the glass fragments separate from the polysilicate material without the integrity of the fire-resistant layer being lost.

According to the present invention, the term primer layer is understood to mean, as is usual in the fire-resistant glazing panels industry, that the adhesion between the glass treated with the primer and the polysilicate is high enough to prevent delamination of the polysilicate layer from the surface of the glass at the normal temperatures of use and for long periods, in particular on storage.

The expression "at the temperatures of the test of behaviour towards fire" is therefore understood as denoting the temperatures encountered by the glass sheet exposed to the fire (or inner sheet). This is because it is not advisable for the fire-resistant body to detach from the outer sheet which has to provide the protection. On the contrary, according to the invention, during the test of behaviour towards fire, the sheet facing away from the fire (or outer sheet) remains colder than the inner sheet, so that the adhesion of the fire-resistant body is unaffected. To give an idea, it may be said that substances which are advantageous for the invention have their adhesion to the polysilicate body reduced at temperatures greater than or equal to approximately 90° C.

Advantageously, each of the glass sheets which constitute the glazing panel is provided, on its surface in contact with the polysilicate body, with the said primer layer. The symmetrical structure of the product facilitates the installing of the glazing panel.

DETAILED DESCRIPTION OF THE INVENTION

In a first embodiment of the invention, the desired aim is achieved by the use of a primer layer formed of a hydrophobic substance.

In an advantageous way, this primer layer is formed from a composition comprising at least one organofunctional silane which has a certain hydrophobic effect. Fluorosilanes, alkylsilanes, phenylsilanes and silicones particularly form part of the silanes which influence the adhesion in a way which varies according to the temperature, that is to say which have, in the case of a test of behaviour towards fire, an effect of decreasing the adhesion. Whereas no separation between the surface of the glass and the polysilicate material is observed with such silanes at the normal temperatures of use and for long periods, they display their effect of decreasing the adhesion at temperatures where the water present in the polysilicate evaporates. Hydrophobic silanes certainly also undergo a chemical reaction with the surface of the glass at the silicon atom but the remaining part of the molecule, which generally consists of a fluorinated alkyl chain, an aliphatic alkyl chain or a siloxane chain, remains unreactive with the polysilicate body and brings about the reduction in the adhesion in the event of fire.

The silanes which are suitable for the aim according to the invention are, for example, the following silanes:

fluoroalkylsilanes, perfluoroalkylsilanes, fluoroalkyltrichlorosilanes, perfluoroalkyltrichlorosilanes, fluoroalkylalkoxysilanes, perfluoroalkylalkoxysilanes, fluoroaliphatic silyl ethers, optionally substituted alkylsilanes and phenylsilanes, such as an alkyltrialkoxysilane, in particular alkyltrimethoxysilane or alkyltriethoxysilane, an alkyltrichlorosilane or a phenyltrialkoxysilane, silicones, such as polydimethylsiloxanes, polydimethylsiloxanes terminated by ethoxyls and polydimethylsiloxanes terminated by methoxyls.

In the preceding list, "alkyl" denotes a hydrocarbon-comprising group which can comprise, for example, from 3 to 10 carbon atoms and "alkoxy" denotes an ether group which can comprise, for example, from 1 to 4 carbon atoms, in particular methoxy or ethoxy groups.

In another advantageous way, which can furthermore be combined with the first, the primer layer is formed from a composition comprising at least one fatty acid or one fatty acid derivative.

Fatty acid is understood to mean a long-chain carboxylic acid, that is to say in which the saturated or unsaturated carbon-comprising chain can comprise, for example, from 8 to 26 carbon atoms, in particular from 10 to 24, preferably from 12 to 20. The fatty acids of use according to the invention can be natural or synthetic in origin. They can correspond in particular to the following formulae: $C_nH_{2n}O_2$ or $C_nH_{(2n-2)}O_2$, where n=8 to 26, preferably from 14 to 20, such as, for example, stearic acid or palmitic acid.

Fatty acid derivative is understood to mean any organic compound formed from a fatty acid as defined above and which includes the said long carbon-comprising chain, for example from 8 to 26 carbon atoms. Mention may be made, as particularly preferred derivative, of fatty acid esters derived from saturated or unsaturated, long- or short-chain alcohols.

Although not possessing a reactive group capable of reacting chemically with the surface of the glass (in contrast to the silicon atom of a silane), these compounds prove to have a very good persistence on the surface of the glass and are capable of forming a primer layer meeting the requirements of the invention.

The fatty acids can be applied in any way in order to form the primer layer on the glass sheet. Preferably, a fine layer of fatty acid or of fatty acid derivative is formed from a solution in an appropriate solvent, for example ethanol or isopropanol, by spraying, by roll coating or by manual application using rags.

In another embodiment of the invention, which can be combined with the first embodiment, the primer layer is formed of a substance for which the softening point is reached or exceeded during the test of behaviour towards fire. This means that the softening point of the substance is less than or equal to the said temperature of the test of behaviour towards fire.

Such a primer layer meets the requirements of the invention owing to the fact that, when the glass sheet exposed to the fire shatters into pieces, the primer layer is softened, optionally melted, and provides a very limited adhesion of the fire-resistant body to the glass sheet and thus offers a very low resistance when the pieces of glass are pulled off. The cohesive forces in the polysilicate material prevail over the adhesion to the glass and the fragments of the glass sheet exposed to the fire separate from the polysilicate material without the integrity of the fire-resistant layer being lost.

Such substances advantageously have a relatively low softening point, for example of the order of 60 to 120° C. However, preference may be given to substances for which the softening point is not excessively low, for example of the order of at least 90° C., in order to be able to endure overheating by sunlight or a heat treatment prior to the installing of the glass or, if appropriate, a hot curing of the fire-resistant polysilicate body.

Mention may in particular be made, as examples of suitable substances, of waxes, equally well vegetable, animal or mineral waxes which are natural or chemically modified, or synthetic waxes.

Natural or synthetic waxes are characterized by a relatively low softening or melting point and by hydrophobic properties due to the presence of organic constituents comprising long carbon-comprising chains. In this respect, it will be noticed that they make it possible to achieve the aim targeted by the invention by the combination of two properties, on the one hand, by a high-temperature softening effect but, also, by a hydrophobic effect, as in the first embodiment.

For a complete description of various families of waxes, reference may be made to the Kirk-Othmer Encyclopaedia, Volume 22, pages 156–173.

Examples of waxes which can be used according to the invention are as follows:

natural waxes vegetable waxes: candelilla wax, carnauba wax, japan wax, esparto wax, cerin, cane wax, castor wax, ouricury wax or montan wax animal waxes: beeswax, shellac, spermaceti or lanolin mineral waxes: cerasin or ozokerite (earth wax)

petroleum derivatives: petrolatum, paraffin or microcrystalline wax chemically modified waxes: esterified montan wax or hydrogenated jojoba wax synthetic waxes: polyolefins or poly(ethylene glycol)s The waxes can be applied to the glass sheet in order to form the primer layer from a solution in an appropriate solvent, it being possible for the resulting layer after evaporation of the solvent to be polished under a slight pressure in order to become perfectly transparent. Better still, they can be deposited on the glass sheet directly by application using rags. The excess substance can subsequently be removed when dry using rags. In this respect, waxes which are very particularly appropriate are, for example, paraffin wax or polyolefin wax comprising a $C_{20}$ to $C_{30}$ chain, preferably.

Mention may be made, as other examples of substances suitable for this second embodiment, of lacquers based on a thermoplastic organic substance. For the present application, the lacquers should be resistant to the alkaline medium of the fire-resistant body based on polysilicate hydrate and have a softening or melting point suited to allowing delamination of the glass at the temperatures of tests of behaviour towards fire.

Their softening/melting point is preferably of the order of 90 to 120° C., advantageously of the order of 100° C.

Preference is particularly given to lacquers of acrylic type based on a dispersion of acrylates. The desired properties of resistance in alkaline medium and of softening can be adjusted to requirements, in particular by varying the nature and the amount of the monomers (acrylic acid ester and other comonomers). Pure acrylate dispersions, in which the dispersed substances have a molecular mass of the order of 50,000 to 150,000 g/mol, are very particularly appropriate in the invention.

Among other advantageous characteristics in the invention, the lacquers preferably exhibit a particle size of between approximately 0.01 µm and 5 µm, preferably of the order of approximately 0.1 µm, with a film or thin-film formation temperature (MFT—Minimum Film-forming Temperature) of the order of 0 to 25° C., preferably between 3 and 17° C.

The dispersions are advantageously devoid of plasticizer. For the purpose of the application technique envisaged, the properties of the dispersions can optionally be optimized by means of other corresponding additives. Thus, the dispersions can be adapted in order to apply the lacquer to the glass sheet by spraying or atomizing or by roll coating. It is possible to add additives, such as modified polydimethylsiloxanes, in order to adjust the wetting and levelling properties of the dispersion, or antifoaming agents or promoters of film formation, such as surface-active polymers.

The lacquers thus applied form, after drying, a transparent primer layer which advantageously has a thickness of the order of 5 µm to 100 µm, preferably of the order of 10 µm to 30 µm.

Other characteristics and advantages of the invention will emerge from the detailed description of the following examples, with regard to a comparative example of a fire-resistant glazing panel according to the state of the art.

COMPARATIVE EXAMPLE

A fire-resistant glazing panel, having surface dimensions of 1.33×1.13 m$^2$, is manufactured from two glass sheets, each with a thickness of 5 mm, made of toughened float glass and from an intermediate layer, with a thickness of 6 mm, of K and Li polysilicate having a K:Li ratio of 8.5:1.5 and an $SiO_2$:($K_2O+Li_2O$) molar ratio of 5:1. The polysilicate is manufactured by preparing a mixture of a 30% silicic acid dispersion in water and alkali metal oxides and by introducing the mixture into the space between the two glass sheets, held apart by a bracing framework and appropriate adhesive bonding, and curing it at room temperature. The water content of the cured polysilicate is 51.2% by weight.

Before assembling the glass sheets, the surface of each of the two glass sheets turned towards the inside is treated with an adhesion-promoting silane, in this instance glycidoxypropyltriethoxysilane.

The fire-resistant glazing panel thus manufactured is subsequently subjected to a test of behaviour towards fire, corresponding to DIN Standard 4102 or ISO/DIS Standard 834-1, by fitting it with a conventional mounting made of stainless steel with a setting of 20 mm in a flame furnace and by exposing it to the flame according to the standard temperature curve (STC).

Already, after a short period, the glass sheet turned towards the fire separates from the body of polysilicate fire-resistant material and pulls off small and large pieces of the body of the fire-resistant material of the fire-resistant layer. This glass sheet splinters after 5 minutes. The fragments of glass fall off in the furnace with the fragments of fire-resistant material which adhere thereto. At the points where the fallen fire-resistant material is lacking, it is found, after a short period of time, that the surface of the outer glass sheet exceeds the maximum allowed temperature of 190° C. The experiment has to be interrupted after 15 minutes. The envisaged resistance time of 30 minutes is not achieved.

EXAMPLE 1 ACCORDING TO THE INVENTION

A fire-resistant glazing panel is manufactured in the same way as described in the comparative example, the only exception being that the surfaces which are in contact with the polysilicate layer are treated with a hydrophobic silane of the perfluoroalkylsilane group. The surface tension of the glass is thus greatly reduced. Thus, for example, the wetting angle of water drops has, after the treatment with the silane, a value of approximately 90°, whereas the wetting angle before the treatment is approximately 40°.

This fire-resistant glazing panel is placed in the flame furnace under the same conditions and the test of behaviour towards fire is carried out as in the comparative example. A short time after the beginning of the test of behaviour towards fire, the glass sheet turned towards the fire also separates from the body of fire-resistant material but, in this case, it separates completely, so that none of the fire-resistant material remains stuck to the glass sheet. When, after 5 minutes, this glass sheet splinters and when the fragments fall off in the furnace, no piece of the fire-resistant material is carried away into the furnace; on the contrary, the entire polysilicate layer is maintained intact over its entire surface as shield (screen) for protecting against fire. Defects are not found with unauthorized high temperatures on the outer face of the glass sheet facing away from the flame furnace. The desired resistance time of 30 minutes is achieved and the test of behaviour towards fire is interrupted after 40 minutes.

As good results are obtained in corresponding tests with treatment of the glass surfaces with alkylsilanes, fluorochlorosilanes and silicones.

EXAMPLE 2 ACCORDING TO THE INVENTION

A fire-resistant glazing panel, having surface dimensions of 1.24×2.05 m$^2$, is manufactured from two glass sheets, each with a thickness of 5 mm, made of toughened float glass and from an intermediate layer, with a thickness of 6 mm, of K and Li polysilicate having a K:Li ratio of 8.5:1.5 and an $SiO_2$:($K_2O+Li_2O$) molar ratio of 5:1, as in Example 1, but with a primer based on fatty acid.

Before assembling the glass sheets, the surface of each of the two glass sheets turned towards the inside is treated with a solution of stearic acid in isopropanol at a concentration chosen between 0.1 and 2% by weight, in the present case 1.5%. The solution is applied by coating by means of rubber rolls.

When subjected to a test of behaviour towards fire, corresponding to DIN Standard 4102 or ISO/DIS Standard 834-1, the fire-resistant glazing panel thus manufactured displays a resistance of greater than 30 min, by virtue of an effect of delamination of the glass fragments of the sheet exposed to the fire.

EXAMPLE 3 ACCORDING TO THE INVENTION

A fire-resistant glazing panel, having surface dimensions of 1.24×2.05 m$^2$, is manufactured from two glass sheets, each with a thickness of 5 mm, made of toughened float glass and from an intermediate layer, with a thickness of 6 mm, of K and Li polysilicate having a K:Li ratio of 8.5:1.5 and an $SiO_2:(K_2O+Li_2O)$ molar ratio of 5:1, as in Example 1, apart from two differences:

a wax-based primer is used;

to manufacture the polysilicate, the mixture of silicic acid and alkali metal oxides is cured between the two glass sheets at a temperature greater than 80° C. (typically of the order of 80 to 90° C.).

Before assembling the glass sheets, the surface of each of the two glass sheets turned towards the inside is provided with a layer of $C_{24}–C_{28}$ paraffin wax. The wax is deposited on the glass sheet by manual application using rags on the glass sheet, which is slightly heated in order to facilitate deposition of the wax.

When subjected to a test of behaviour towards fire, corresponding to DIN Standard 4102 or ISO/DIS Standard 834-1, the fire-resistant glazing panel thus manufactured displays a resistance of greater than 30 min, by virtue of an effect of delamination of the glass fragments of the sheet exposed to the fire.

EXAMPLE 4 ACCORDING TO THE INVENTION

A fire-resistant glazing panel, having surface dimensions of 1.24×2.05 m², is manufactured from two glass sheets, each with a thickness of 5 mm, made of toughened float glass and from an intermediate layer, with a thickness of 6 mm, of K and Li polysilicate having a K:Li ratio of 8.5:1.5 and an $SiO_2:(K_2O+Li_2O)$ molar ratio of 5:1, cured at room temperature, as in Example 1, or with heating, as in Example 3, but with a lacquer-based primer.

Before assembling the glass sheets, the surface of each of the two glass sheets turned towards the inside is coated with a layer of lacquer.

The lacquer is applied by atomizing a composition comprising:

100 parts by weight of a dispersion of pure acrylate with a molecular weight of 120,000 g/mol, 0.2 part by weight of an additive for counteracting coalescence, 0.5 part by weight of a wetting and levelling additive based on a modified polydimethylsiloxane, and 0.2 part of an antifoaming agent composed of a combination of surface-active polymers.

The desired Theological properties were achieved by diluting the lacquer with deionized water until an optimum viscosity for the purpose of the atomizing technique is obtained. Dilution with 20% of water is generally suitable.

The thickness of the dry lacquer layer after evaporation of the aqueous phase and curing at approximately 60° C. for approximately 10 minutes was 50 µm.

When the fire-resistant glazing panel thus manufactured is subjected to a test of behaviour towards fire, corresponding to DIN Standard 4102 or ISO/DIS Standard 834-1, the glass sheet exposed to the fire detaches completely from the fire-resistant body after 3 minutes, without a single polysilicate residue remaining on the glass.

What is claimed is:

1. Fire-resistant glazing panel comprising at least two glass sheets, between which is placed a transparent fire-resistant layer made of a cured alkali metal polysilicate hydrate having an $SiO_2:M_2O$ ratio of at least 3:1 (where M denotes at least one alkali metal) and a water content of 25 to 60% by weight, in which glazing panel at least one glass sheet is provided, on its surface which is in contact with the polysilicate layer, with a layer of primer which has an influence on the adhesion, wherein the said at least one glass surface which is in contact with the polysilicate layer is provided with a primer layer, the adhesion of which to the fire-resistant layer decreases at the temperatures of the test of behaviour towards fire.

2. Fire-resistant glazing panel according to claim 1, wherein the primer layer is formed of a hydrophobic substance.

3. Fire-resistant glazing panel according to claim 2, wherein the primer layer is formed from a composition comprising at least one organofunctional silane having a hydrophobic effect.

4. Fire-resistant glazing panel according to claim 3, wherein the primer layer is formed from a composition comprising at least one silane chosen from the group of the following silanes: fluoroalkylsilanes, perfluoroalkylsilanes, fluoroalkyltrichlorosilanes, perfluoroalkyltrichlorosilanes, fluoroalkylalkoxysilanes, perfluoroalkylalkoxysilanes, fluoroaliphatic silyl ethers, alkylsilanes, phenylsilanes, and silicones.

5. Fire-resistant glazing panel according to claim 1, wherein the primer layer is formed from a composition comprising at least one fatty acid or fatty acid derivative.

6. Fire-resistant glazing panel according to claim 1, wherein the primer layer is formed of a substance for which the softening point is less than or equal to the said temperature of the test of behaviour towards fire.

7. Fire-resistant glazing panel according to claim 6, wherein the primer layer is formed of a substance for which the softening point is of the order of 60 to 120° C.

8. Fire-resistant glazing panel according to claim 6, wherein the primer layer is formed of a substance for which the softening point is greater than or equal to 90° C.

9. Fire-resistant glazing panel according to claim 6, wherein the primer layer is formed of a thermoplastic-based lacquer.

10. Fire-resistant glazing panel according to claim 9, wherein the primer layer is formed from a lacquer comprising dispersed organic particles with a size of the order of 0.01 µm to 5 µm.

11. Fire-resistant glazing panel according to claim 9, wherein the primer layer is formed from a lacquer comprising organic particles having a film formation temperature (MFT) of the order of 0 to 25° C.

12. Fire-resistant glazing panel according to claim 1, wherein the primer layer is formed of a wax.

* * * * *